(12) United States Patent
Tan et al.

(10) Patent No.: US 11,144,215 B2
(45) Date of Patent: Oct. 12, 2021

(54) METHOD, APPARATUS AND ELECTRONIC DEVICE FOR CONTROLLING MEMORY ACCESS

(71) Applicant: Beijing Horizon Robotics Technology Research and Development Co., Ltd, Beijing (CN)

(72) Inventors: Honghe Tan, Beijing (CN); Liang Chen, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 0 days.

(21) Appl. No.: 16/697,954

(22) Filed: Nov. 27, 2019

(65) Prior Publication Data
US 2020/0174682 A1 Jun. 4, 2020

(30) Foreign Application Priority Data
Nov. 29, 2018 (CN) .......................... 201811440175.9

(51) Int. Cl.
*G06F 3/06* (2006.01)
(52) U.S. Cl.
CPC .......... *G06F 3/0622* (2013.01); *G06F 3/0655* (2013.01); *G06F 3/0673* (2013.01)
(58) Field of Classification Search
CPC ..... G06F 3/0622; G06F 3/0655; G06F 3/0673
See application file for complete search history.

(56) References Cited

U.S. PATENT DOCUMENTS

| | | | |
|---|---|---|---|
| 4,323,965 A | 4/1982 | Johnson et al. | |
| 6,314,505 B1 | 11/2001 | Nakashima et al. | |
| 8,006,044 B2 | 8/2011 | Qawami et al. | |
| 2003/0120855 A1 | 6/2003 | Hatakeyama et al. | |
| 2007/0067554 A1* | 3/2007 | Hinrichs | G06F 13/4234 710/316 |
| 2009/0217004 A1 | 8/2009 | Van De Waerdt et al. | |
| 2017/0270977 A1 | 9/2017 | Onuki | |

(Continued)

FOREIGN PATENT DOCUMENTS

| | | |
|---|---|---|
| CN | 101057224 A | 10/2007 |
| CN | 100559360 C | 11/2009 |

(Continued)

*Primary Examiner* — Kalpit Parikh
(74) *Attorney, Agent, or Firm* — Lando & Anastasi, LLP

(57) ABSTRACT

A method, an apparatus, and an electronic device for controlling memory access are disclosed. According to an embodiment, there is provided a method for controlling access to a memory including a plurality of memory modules configured in parallel. The method comprises: receiving an access instruction including an addressing field which comprise a parallel control field for controlling parallel access, a module address field for indicating a memory module, and an in-module address field for indicating an addresses within a memory module; parsing the access instructions to determine the parallel control field, the module address field and the in-module address field; determining one or more memory modules to be accessed based on the parallel control field and the module address field; and accessing one or more addresses which are within the one or more memory modules to be accessed and assigned by the in-module address field.

16 Claims, 6 Drawing Sheets

(56) References Cited

U.S. PATENT DOCUMENTS

2017/0300435 A1     10/2017    Becker et al.
2018/0329832 A1     11/2018    Takaku et al.

FOREIGN PATENT DOCUMENTS

| | | | |
|---|---|---|---|
| CN | 107291641 | A | 10/2017 |
| JP | H02116943 | A | 5/1990 |
| JP | H10476643 | A | 3/1992 |
| JP | 2003186866 | A | 7/2003 |
| JP | 2017182867 | A | 10/2017 |
| KR | 10-2000-0028546 | A | 5/2000 |
| KR | 10-2007-0086246 | A | 8/2007 |
| KR | 10-2017-0117326 | A | 10/2017 |
| TW | 201037527 | A | 10/2010 |
| WO | 2005070106 | A2 | 8/2005 |

\* cited by examiner

100

S110 receiving an access instruction including an addressing field which comprises a parallel control field for controlling a parallel access, a module address field for indicating a memory module, and an in-module address field for indicating an address within a memory module

S120 parsing the access instruction to determine the parallel control field, the module address field and the in-module address field

S130 determining one or more memory modules to be accessed based on the parallel control field and the module address field

S140 accessing one or more addresses which are within the one or more memory modules to be accessed and assigned by the in-module address field

FIG. 2

METHOD, APPARATUS AND ELECTRONIC DEVICE FOR CONTROLLING MEMORY ACCESS

CROSS-REFERENCE TO RELATED APPLICATION(S)

The present application claims the priority of Chinese patent application No. 201811440175.9 filed on Nov. 29, 2018, the disclosure of which is hereby expressly incorporated by reference herein in its entirety.

TECHNICAL FIELD OF THE DISCLOSURE

The present application generally relates to the arts of computers, and in particular, relates to a method, an apparatus and an electronic device for controlling memory access.

BACKGROUND

The development of computer hardware continues all the time, wherein the capacity of memories is also getting bigger than before. High-capacity memories usually comprise a plurality of memory modules, which are also referred to as memory grains. For example, both dynamic random access memory (DRAM) used as RAMs and static random access memories (SRAM) used as caches can comprise a plurality of memory modules. The width of access data is 32 bits where the data width of memory module is 32 bits, and the width of access data is 64 bits where the data width of memory module is 64 bits. Each memory module can be accessed flexibly by setting the access data width thereof the same with the data width of memory module. However, there is a problem with such a solution that an amount of data determined by the data width of the memory module could be accessed during each period at most, resulting in that the bandwidth is limited. In case the amount of data desired to be accessed, e.g., 1024 bits, exceeds the data width of a memory module, they could be acquired from the memory module through a plurality of periods. On the other hand, for the purpose of improving the efficiency of data access, the width of access data can be configured to be larger than the data width of a single memory module, for example 512 bits, thus sixteen memory modules with data width of 32 bits, or eight memory modules with data width of 64 bits can be synchronously accessed. Although the bandwidth as well as the amount of data to be accessed within one period can be increased in this way, the flexibility of the access decreases.

SUMMARY

For the purpose of solving the technical problems listed above, the present application is presented.

According to one aspect of the present application, a method for controlling memory access is provided, wherein the memory comprises a plurality of memory modules configured in parallel, and the method comprises: receiving an access instruction including an addressing field which comprises a parallel control field for controlling parallel access, a module address field for indicating a memory module, and an in-module address field for indicating an address within a memory module; parsing the access instruction for determining the parallel control field, the module address field and the in-module address field; determining one or more memory modules to be accessed based on the parallel control field and the module address field; and accessing one or more addresses which are within the one or more memory modules to be accessed and assigned by the in-module address field.

According to another aspect of the present application, an apparatus for controlling memory access is provided for controlling access to a memory, wherein the memory comprises a plurality of memory modules configured in parallel, and the apparatus comprises: an instruction parsing unit, for parsing an access instruction including an addressing field, wherein the addressing field comprises a parallel control field for controlling parallel access, a module address field for indicating a memory module, and an in-module address field for indicating an address within a memory module; a module determining unit, for determining one or more memory modules to be accessed based on the parallel control field and the module address field; and an access performing unit, for carrying out the access to one or more addresses which are within one or more memory modules to be accessed and assigned by the in-module address field.

According to another aspect of the present application, there is provided an electronic device, comprising: a processor; and a memory including program instructions stored thereon to cause the processor to perform the above method for controlling memory access when executed by the processor.

According to another aspect of the present application, there is provided a readable storage media including program instructions stored thereon to cause the processor to perform the above method for controlling memory access when executed by the processor.

Through the method, apparatus and electronic device of the present application for controlling memory access, one or more memory modules to be accessed may be controlled flexibly, thereby a good balance between the access flexibility and the access bandwidth can be achieved, and thus access efficiency is improved.

BRIEF DESCRIPTION OF THE DRAWINGS

The above mentioned and other objectives, technical features and advantages of the present application will be more apparent from the following detailed description in conjunction with the accompanying drawings. The accompanying drawings, which are included to provide a further understanding of the embodiments, constitute a part of the present application. The drawings and the embodiments should not be construed as limiting the present disclosure, but are intended to be illustrative only. In the accompanying drawings, like reference numerals usually represent like components or steps.

FIG. 2 shows a flow chart illustrating a method for controlling memory access according to some embodiments of the present application;

DETAILED DESCRIPTION

Figure 1:
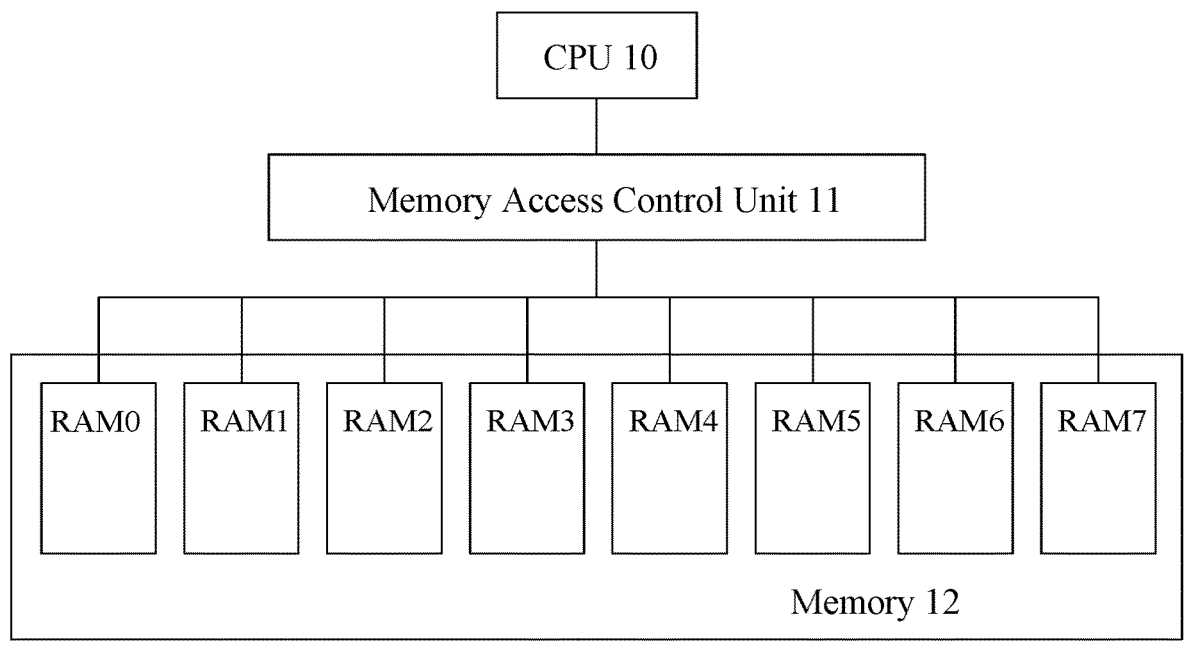
FIG. 1 shows a structural schematic diagram of a system for controlling memory access according to an embodiment of the present application.

Herein below, some exemplary embodiments are described in detail by referring to accompanying drawings. It is apparent that the described embodiments are only parts of the embodiments, and that it is not intended to represent all of the embodiments. It shall be appreciated that the present application will not be limited by the exemplary embodiments described herein.

General Concept

As described above, the data width of memory modules constituting the memory is in general for example 32 bits or 64 bits, and the width of access data is in general also 32 bits or 64 bits, therefore a flexible access to each memory module is achieved. However, the defect of such solution lies in that only 32 bits or 64 bits could be accessed during each period, such that the bandwidth is limited. On the other hand, although the amount of data to be accessed during one period may be improved where the bus bandwidth is configured to be either 512 or 1024 bits and a plurality of memory modules are synchronously accessed, the flexibility of access decreases due to, for example, it is necessary to synchronously access a plurality of memory modules, excluding access to a single memory module in a flexible way.

Regarding the above technical problems, the basic inventive concept of the present application lies in that, an access instruction is configured to include an addressing field which comprises a parallel control field for controlling a parallel access, a module address field for indicating a memory module, and an in-module address field for indicating an address within a memory module. Thus a flexible access to memory modules in a memory could be achieved. For example, either a simultaneous access to a plurality of memory modules, or an access only to a single memory module could be achieved. In case of simultaneously accessing a plurality of memory modules, either a plurality of continuous memory modules, or a plurality of discontinuous (spaced) memory modules can be accessed. Thus, the flexibility of access is guaranteed, and more data can be accessed during one period and access efficiency is improved, by simultaneously accessing a plurality of memory modules.

Herein, it is to be understood by a person skilled in the art that the solution of the present application for controlling memory access can be used for controlling accesses to various memories, as long as they comprise a plurality of memory modules which can be parallelly accessed. Typically, the solution of the present application for controlling memory access is applicable to a static random access memory (SRAM) normally used as caches and a dynamic random access memory (DRAM) normally used as RAM. It shall also be understood that the principles of the present application are not limited to that all of the plurality of memory modules in the memory are of the same type, instead the plurality of memory modules may be of different types.

In addition, it is to be understood by a person skilled in the art that the method for controlling memory access provided by the present application is applicable to the current hardware architectures such as CPU, GPU or FPGA system etc., and it also can be implemented on novel hardware architectures exclusively developed for executing the above described access instructions.

Following basic principles of the present application, various non-limiting embodiments of the present application will be specifically explained by referring to accompanying drawings hereafter.

Exemplary System

FIG. 1 shows a structural schematic diagram of an exemplary system for controlling memory access according to some embodiments. As shown in FIG. 1, a memory 12 may comprise a plurality of memory modules configured in parallel, which are illustrated as eight memory modules herein, i.e., RAM 0 to RAM 7. Each memory module among RAM 0-RAM 7 can be either an SRAM or a DRAM, or further can be of other types. In other instances, memory 12 also can comprise a smaller or larger amount of memory modules, for example 2, 4, 16, 32, etc.

For the purpose of the convenience, each RAM is illustrated as one memory module herein. It shall be understood that, one memory module also may comprise a plurality of RAMs, and a number of RAMs in each memory module can be synchronously operated as one group, such that the data width of each memory module can be increased. Or, a number of memory modules may be assembled into one group to be operated when necessary. Under the teaching of the present application, the operation for these groups will be obvious for a person skilled in the art.

A memory access control unit 11 can be used for controlling the access to the memory 12 by a processor such as CPU 10. For example, the memory access control unit 11 can receive access instructions from CPU 10, based on which the control unit 11 accesses the specific address within one or more respective modules in memory 12, to read or write data, respectively. As described above, a flexible access to memory 12, for example either an access to a single module or parallel accesses to a plurality of modules could be achieved, by means of the access instructions.

Hereinafter, some examples of controlling the access to a memory based on access instructions, as well as access processes carried out by executing access instructions will be described in detail in conjunction with the accompanying drawings.

Exemplary Methods

FIG. 2 shows a flow chart illustrating a method for controlling the memory access according to some embodiments.

As shown in FIG. 2, the method for controlling memory access 100 according to an embodiment of the present application can comprise:

S110, receiving an access instruction including an addressing field which comprises a parallel control field used for controlling parallel access, a module address field used for indicating a memory module, and an in-module address field used for indicating an address within a memory module;

S120, parsing the access instruction to determine the parallel control field, the module address field and the in-module address field;

S130, determining one or more memory modules to be accessed based on the parallel control field and the module address field; and S140, accessing one or more addresses which are within the one or more memory modules to be accessed and assigned by the in-module address field.

At step S110, for example, the access instruction from CPU 10 can be received. The access instruction may be stored in an instruction storage unit previously, such as an instruction register (IR) of CPU 10. The access instruction can comprise for example an addressing field indicating a memory address to be accessed, which can be either a single address or a plurality of addresses to be parallelly accessed, as described hereafter. Although not shown, the access instruction may further comprise for example a read/write indication field, a data field etc., wherein the read/write indication field may indicates whether this access instruction is "read" instruction or "write" instruction, and the data field may comprise data to be written etc.

Figure 3:
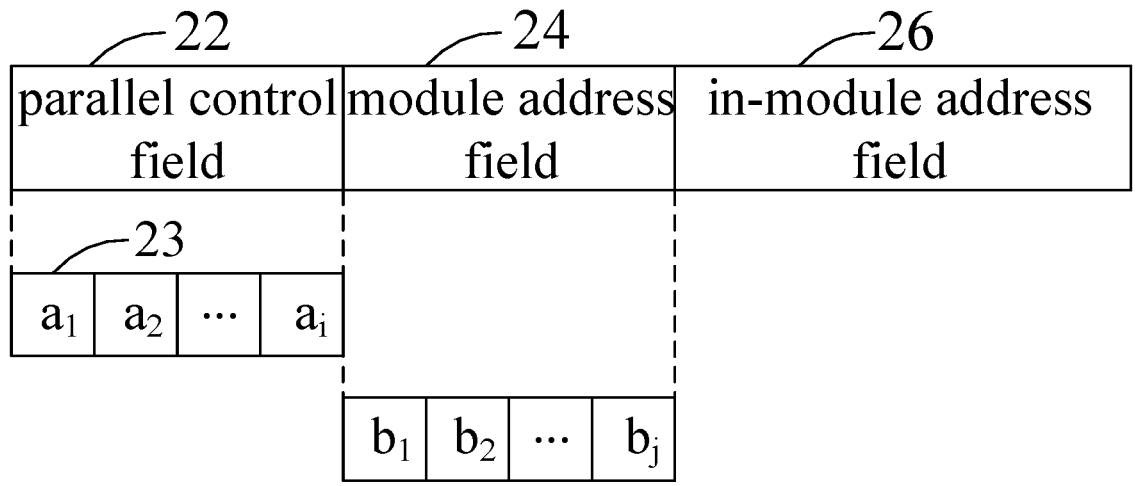
FIG. 3 shows a schematic diagram of a first exemplary structure of an addressing field in an access instruction according to an embodiment of the present application.

As described above, in embodiments of the present application, a flexible access to one or more memory modules in the memory 12 can be implemented by setting the access instruction of an addressing field. FIG. 3 shows a schematic diagram of a first exemplary structure of an addressing field in an access instruction according to an embodiment of the present application. As shown in FIG. 3, an addressing field 20 may comprise a parallel control field 22, a module address field 24 and an in-module address field 26. It shall be noted that, the sequence of respective fields is not limited to the example illustrated in the figure, but can be any desired order.

The module address field 24 can indicate one or more memory modules to be accessed, which may comprise a plurality of bits, i.e., $b_1, b_2, \ldots, b_j$, to indicate memory module in an amount of $2^j$. For example, when memory 12 comprises $2^2(4)$ memory modules, the module address field 24 may comprise two bits of data, the values of which can be "00", "01", "10" or "11", to indicate four memory modules respectively. Similarly, the module address field 24 can comprise data in an amount of three bits when memory 12 comprises eight memory modules; the module address field 24 can comprise data in an amount of four bits when memory 12 comprises sixteen memory modules. In some instances, the number of memory modules included in memory 12 can be less than 21 when the module address field 24 comprises data in an amount of j bits, as long as it can be guaranteed that an addressing operation to each module via the module address field 24 can be carried out. For the purpose of simplicity, descriptions will be made by means of an example in which the module address field 24 comprises five bits of data (j=5), and memory 12 comprises 32 memory modules namely RAM 0-31 hereafter.

An in-module address field 26 can be used for indicating one or more addresses within one or more memory modules to be accessed. The number of bits of the in-module address filed 26 depends on the size of the memory modules. For example, when each memory module is of 1024×8 bits, the in-module address field 26 may comprise 10 bits of data, to carry out addressing operations for $2^{10}(1024)$ addresses, wherein 1024 (1 k) is the length of storage space of a memory module, 8 is the bit width. When the length of the storage space of a memory module is 16 k, the in-module address field 26 may comprise 15 bits of data.

As described above, the specific address of the specific memory module to be accessed can be determined by the use of a module address field 24 and an in-module address field 26. For the purpose of flexibly accessing to one or more memory modules, the addressing field 20 can further comprise a parallel control field 22 to indicate the one or more memory modules to be parallelly accessed. In the example of FIG. 3, the parallel control field 22 comprises a module control code 23 which may comprise one or more bits, i.e., $a_1, a_2, \ldots, a_i$. The number of bits of module control code 23 can be for example equal to the number of bits namely j, of the module address field 24, thereby as described in detail hereafter, a control code operation can be carried out for each bit of module address field 24. In other embodiments, the number of bits of the module control codes 23 namely i, can be less than the number of bits of module address field 24 namely j, thereby control codes operations may be carried out for only portions of the bits of the module address field 24.

Herein, a "control code operation" means that a module control code 23 can indicate that a corresponding bit in module address field 24 has arbitrary values, for example "0" or "1", rather than the value defined by the module address field 24 per se. For convenience of description, assuming that both module control code 23 and module address field 24 have 5 bits, the module address field 24 may comprise an arbitrary value of 5 bits, namely $b_1b_2b_3b_4b_5$, to indicate any module of 1 st to 32nd memory module. The module control code 23 can have a value, e.g., 00001, which indicates that corresponding bit $b_5$ in module address field 24 can be an arbitrary value namely "0" or "1", thereby both memory modules of $b_1b_2b_3b_40$ and $b_1b_2b_3b_41$ can be parallelly accessed; when module control code 23 has a value, e.g., 00011, which indicates that the corresponding bits $b_4$ and $b_5$ in module address field 24 can be an arbitrary value namely "0" or "1", thereby four memory modules of $b_1b_2b_300$, $b_1b_2b_301$, $b_1b_2b_310$ and $b_1b_2b_311$ can be parallelly accessed; and so on, when module control code 23 has a value, e.g., example 11111, all of the 32 memory modules can be parallelly accessed. In some instance, the number of bits i of module control code 23 can be restricted, through which only portions of the memory modules can be accessed. For example, when system bus bandwidth is equal to the sum of bit width of sixteen memory modules, module control code 23 can only comprise 4 bits, thereby sixteen memory modules can be parallelly accessed at most, to not exceed the limitation of the bus bandwidth. In a particular example embodiment, all of the bits of the module control code 23 can be valued as zero, then only one memory module namely $b_1b_2b_3b_4b_5$ can be accessed.

In the examples above, module control code 23 comprises continuous values "1" from the lowest bit, thereby indicating a plurality of continuous memory modules can be accessed. In some other embodiments, module control code 23 also can comprise one or more low bit values of zero, for example a value of 00010, as such two discontinuous memory modules of $b_1b_2b_30b_5$ and $b_1b_2b_31b_5$ can be parallelly accessed; when the value is 01010, it indicates that four discontinuous memory modules, namely $b_10b_30b_5$, $b_10b_31b_5$, $b_11b_30b_5$ and $b_11b_31b_5$, can be parallelly accessed. In short, module control code 23 can indicate that the an arbitrary bit in module address field 24 can have an arbitrary value, thereby one or more continuous or discontinuous memory modules will be flexibly accessed.

Thus, as described above, one or more memory module addresses can be acquired by that the corresponding bits in module address field 24 could be valued as an arbitrary value based on module control code 23, thereby the corresponding one or more memory modules can be parallelly accessed. A high access flexibility could be achieved, and a high data access efficiency could be guaranteed.

Figure 4:
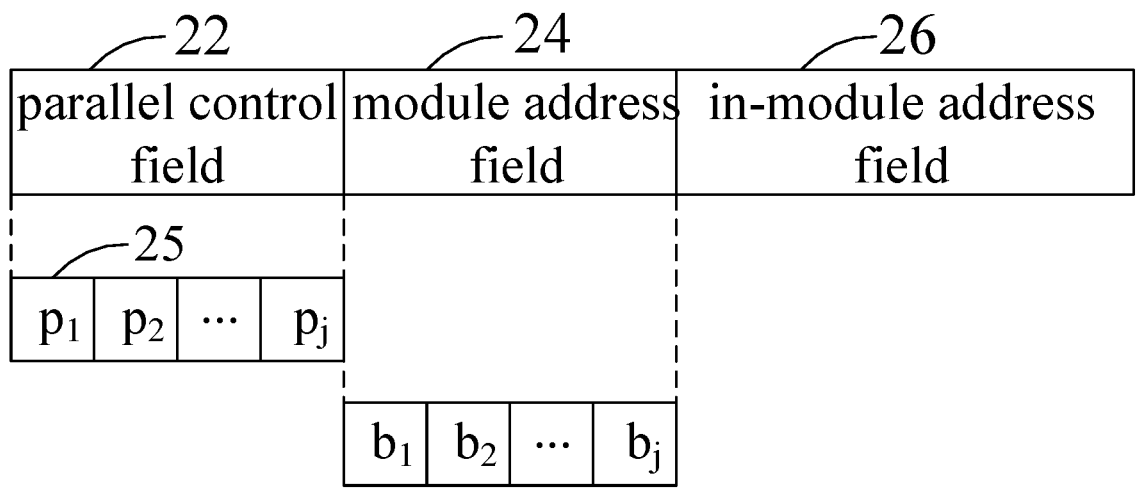
FIG. 4 shows a schematic diagram of a second exemplary structure of an addressing field in an access instruction according to an embodiment of the present application.

FIG. 4 shows a schematic diagram of a second exemplary structure of an addressing field in an access instruction according to an embodiment of the present application. As shown in FIG. 4, some fields in the second exemplary structure are same with those of the first exemplary structures of FIG. 3. Hereafter, only the features different from the aforementioned embodiments will be described to avoid redundancy.

As shown in FIG. 4, a parallel control field 22 can comprise a module quantity field 25 which indicates the number of memory modules to be parallelly accessed beginning at the memory module assigned by the module address field 24. Module quantity field 25 may comprise the same amount of bits with that of module address field 24, for example p1, p2, . . . , pj shown in FIG. 4, thereby all the memory modules can be parallelly accessed at most. The number of bits of module quantity field 25 also can be less than that of module address field 24, for example the former is 4, while the latter is 5, thus at most 16 modules within 32 memory modules can be parallelly accessed. Herein, by the use of module quantity field 25, a plurality of continuous modules starting from the module assigned by module address field 24 will be parallelly accessed. For example, when the module quantity field 25 is 00010, three memory modules beginning at the module assigned by module address field 24, i.e., modules with addresses of $b_1b_2b_3b_4b_5+00$, $b_1b_2b_3b_4b_5+01$, $b_1b_2b_3b_4b_5+10$, may be parallelly accessed; for example, when the module quantity field 25 is 00011, four memory modules beginning at the module assigned by module address field 24, i.e., modules with addresses of $b_1b_2b_3b_4b_5+00$, $b_1b_2b_3b_4b_5+01$, $b_1b_2b_3b_4b_5+10$ and $b_1b_2b_3b_4b_5+11$, can be accessed. In one example, when the value of module quantity field 25 is 0, only one module assigned by module address field 24 per se can be accessed.

In some embodiments, circular addressing can be used when determining a plurality of modules to be parallelly accessed based on the module quantity field 25 and module address field 24. For example, when module address field 24 indicates the 31st module among the 32 modules, and the value of module quantity field 25 is 00011, these four modules of 31st, 32nd, 1st and 2nd can be accessed.

It can be seen that, compared with the example shown in FIG. 3, by using module quantity field 25, it can be easier to determine the starting module and end module of the plurality of modules to be parallelly accessed; while in the example of FIG. 3, the address bit value of a certain module of the starting module is in general zero, and the bit value of the end module in general is one.

Figure 5:
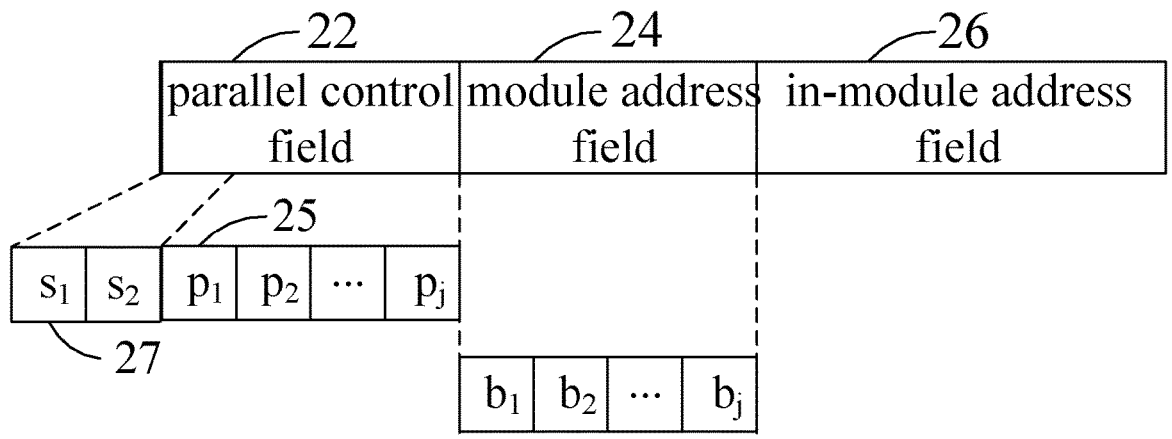
FIG. 5 shows a schematic diagram of a third exemplary structure of an addressing field in an access instruction according to an embodiment of the present application.

In some embodiments, module quantity field 25 further can be used together with other fields, to access a plurality of discontinuous modules starting from the module assigned by module address field 24. FIG. 5 shows a structure of a third exemplary of an addressing field in an access instruction, which shares a lot with structure of the second exemplary shown in FIG. 4. Hereafter, only the features different from the aforementioned embodiments will be described to avoid redundancy.

As shown in FIG. 5, in addition to the module quantity field 25, a parallel control field 22 further comprises a stride field 27 to indicate an interval among a plurality of memory modules to be accessed. That is to say, based on module quantity field 25, stride field 27 and module address field 24 in the parallel control field 22, a plurality of memory modules which start from the memory module assigned by module address field 24, and have an interval step assigned by stride field 27 and a quantity assigned by module quantity field 25 can be determined. The number of bits of stride field 27 can be less than that of module address field 24 and/or module quantity field 25. For example, in FIG. 5 an example is shown with only two bits namely s1 and s2. Assuming that the value of module address field 24 is "00010", which means the third memory module among 32 memory modules is assigned, the value of module quantity field 25 is 00011, which means to access four memory modules (00010+00000, 00010+00001, 00010+00010, 00010+00011), and the values of stride field 27 is 01, which means the interval is one module, then it can be finally determined the modules to be accessed are the third, fifth, seventh and ninth module. When the value of step field 27 is 00 which indicates that the interval is zero, a plurality of continuous modules can be accessed. As described above, by setting the stride field 27, a plurality of continuous or discontinuous memory modules can be accessed according to necessities.

Figure 6:
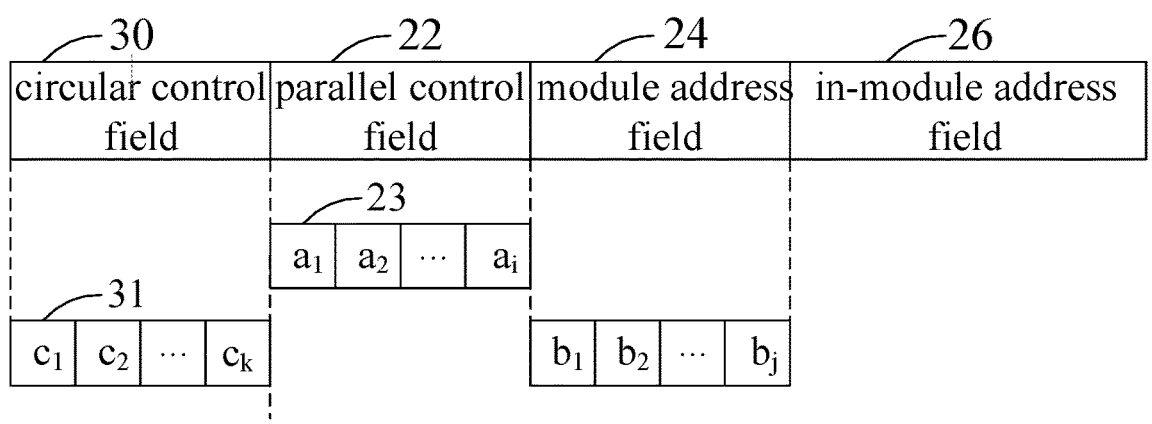
FIG. 6 shows a schematic diagram of a forth exemplary structure of an addressing field in an access instruction according to an embodiment of the present application.

FIG. 6 shows a schematic diagram of a fourth exemplary structure in an addressing field of an access instruction according to an embodiment of the present application. As shown in FIG. 6, the structure of the fourth exemplary shares a lot with the structure of the first exemplary in FIG. 3. Hereinafter, only the features different from the aforementioned embodiments will be described to avoid redundancy.

As shown in FIG. 6, in addition to a parallel control field 22, a module address field 24 and an in-module address field 26, an addressing field in an access instruction can further comprise a circular control instruction 30 to control the range of one or more memory modules which can be parallelly accessed. In the example of FIG. 6, circular control instruction 30 may comprise a circular control code 31 similar with that of module control code 23. For example, a plurality of bits $c_1, c_2, \ldots, c_k$ are included in the circular control code. The number of bits of circular control codes 31, i.e., k, shall be larger than or equal to the number of bits of module control codes 23 i.e. i, and shall be less than or equal to the number of bits of module address field 24, i.e., j. For example, they can be equal to each other, namely i=j=k. Similar with module control code 23, the circular control code 31 indicates that the corresponding bits in the module address field 24 may have an arbitrary values, thereby one or more memory module addresses can be determined to be used as the circular range of parallel access addresses. It shall be understood that, parallel access module addresses determined based on module control code 23 shall fall within the circular range determined based on circular control code 31. Accordingly, the bits which are within module address field 24 and corresponding to module control code 23 shall be included within the bits range corresponding to circular control code 31. Thus, a parallel access may start from one or more memory modules determined by module control code 23 together with module address field 24 within parallel control field 22, and circulate within a circular range determined based on circular control code 31. That is to say, when the access reaches at the end of one memory module, address will increase, and the access will move to the next module. If the address of the next module is within the circular range, the access to the next module can be continued; however, if the next module is beyond the circular range, it shall jump to the starting module of the circular range, thereby the circular addressing could be guaranteed within the circular range. As described above, through circular addressing, the memory accesses can be defined within the desired circular range, thereby avoiding problems such as RAM or buffer overflow etc.

For example, assuming that module address field 24 is 00010, module control code 23 is 00001, circular control code 31 is 00011, therefore the third (00010) and fourth (00011) module can be parallelly accessed, and the access shall be circulating within the modules of first (00000), second (00001), third (00010) and fourth (00011). The access will begin at address which is within the third and fourth module and determined by in-module address field 26. As the access proceeds, the address will increase, and when it reaches at the end of the third and fourth module, the address will increase to reach at the beginning of the fifth and sixth module. Since the fifth module and sixth module are outside the circular range, at this moment, the access will be forced to the beginning of circular range based on circular range determined by circular control code 23, namely the first module and second module, thus the access to first and second module will continue.

Figure 7:
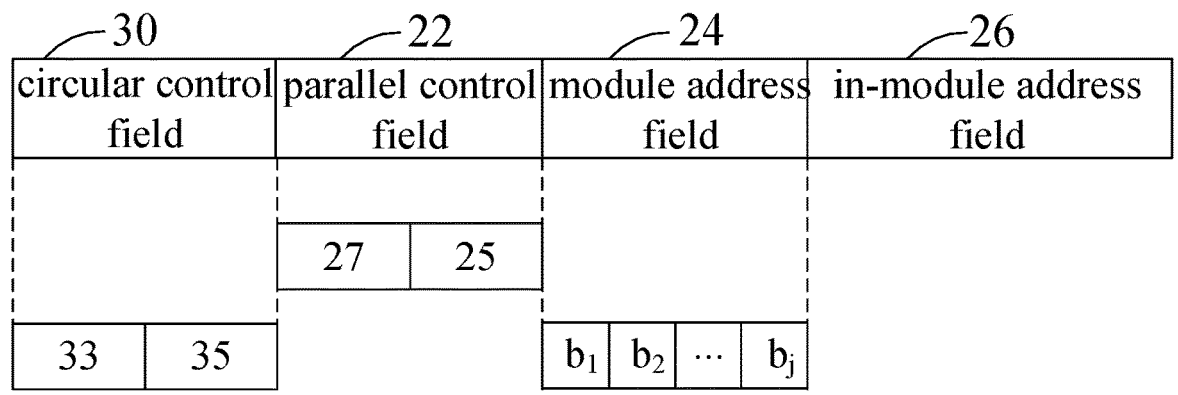
FIG. 7 shows a schematic diagram of a fifth exemplary structure of an addressing field in an access instruction according to an embodiment of the present application.

FIG. 7 shows a schematic diagram of a specific structures of a fifth example in an addressing field of an access instruction according to an embodiment of the present application. As shown in FIG. 7, the structure of fifth example shares a lot with structure of the third example shown in FIG. 5 or structure of the fourth example shown in FIG. 6. Hereafter, only the features different from the aforementioned embodiments will be described to avoid redundancy.

As shown in FIG. 7, circular control field 30 may comprise a starting field 33 and an end field 35, wherein the starting field indicates a starting memory module, and the end field 35 indicates an end memory module, both of which together indicate the range of circular addressing. For example, the starting field 33 may directly comprise the module address of the starting memory module The end field 35 may directly comprise the module address of the end memory module, or may comprise the quantity of memory modules which can be accessed beginning at a module assigned by the starting field 33, thereby the module address of the end memory module can be calculated. By setting starting field 33 and end field 35, the range of circular access can be determined in a clear and intuitive way. When accessing, the access to memory 12 shall be a circular addressing between the starting memory module assigned by the starting field 33 and the end memory module assigned by end field 35.

For example, assuming that the circular range is 0-7 within 32 memory modules, i.e., 0-31, and it can be determined that the memory modules to be parallelly accessed are 5 and 7 based on module address field 24 and module quantity field 25 and stride field 27 within parallel control field 22. When reaching the end of memory module, the access will move to memory modules 6 and 8. Although the memory module 6 is within the circular range, the memory module 8 is beyond the circular range, so it will jump to the beginning of circular range automatically, thus the access will move to the memory modules 6 and 0.

On the other hand, when the memory modules to be parallelly accessed are determined based on module address field 24, module quantity field 25 and stride field 27, they should also be within the circular range. For example, when the circular range is 0-7, while the memory modules to be parallelly accessed are determined as 6 and 8 based on module address field 24, module quantity field 25 and stride field 27, a circular addressing operation need to be carried out within the circular range, thereby it is finally determined that the memory modules to be parallelly accessed shall be 6 and 0.

For the purpose of convenience of description, in exemplary embodiments referring to FIG. 6 and FIG. 7, circular control field 30 is described as a separate field from control field 22, however, it shall be understood that, circular control field 30 also can be deemed to be a sub-field of parallel control field 22, which should be considered as falling with the principles discussed above.

Various examples of addressing fields in an access instruction have been described hereinabove. Referring back to FIG. 1, at step S120, an access instruction is parsed to determine a parallel control field 22, a module address field 24 and an in-module address field 26. It shall be understood that, the structure of the access instruction, including the orders and lengths etc. of respective fields, can be predicted. The respective field values of various fields in an access instruction, including the various sub-fields in the addressing field described in detail hereinabove, can be determined through the parsing step S120.

Referring continue to FIG. 1, at step S130, one or more memory modules to be accessed are determined based on a parallel control field and a module address field. The details of this step have been described in the above description regarding FIG. 3 to FIG. 7, thus will not be repeated here.

At step S140, one or more addresses which are within the one or more memory modules to be accessed and assigned by the in-module address field are accessed. As described above, the access can be reading or writing operation according to the type of the access instruction. When a plurality of data are being read or written, addresses can be accumulated accordingly. It shall be noted that, as described above, if the addressing filed in the access instruction has defined a circular addressing range, the access address shall be within this circular range.

Exemplary Apparatus

Figure 8:
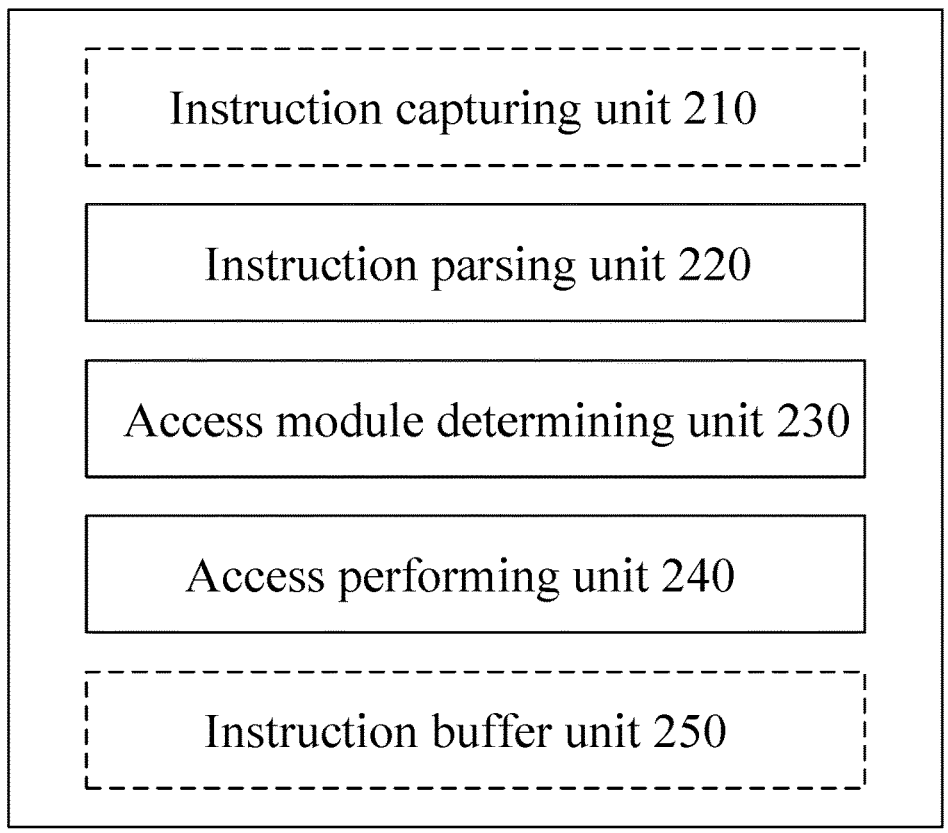
FIG. 8 shows a functional block diagram of an apparatus for controlling memory access according to an embodiment of the present application.

FIG. 8 shows a functional block diagram of an apparatus for controlling memory access according to an embodiment of the present application.

An apparatus 200 for controlling memory access according to an embodiment of the present application is used for controlling, for example, access of CPU 10 to a memory 12 including a plurality of memory modules configured in parallel. As shown in FIG. 8, the apparatus 200 for controlling memory access optionally comprises an instruction capturing unit 210 for obtaining an access instruction from an instruction storage unit. For example, the instruction capturing unit 210 may capture an access instruction from an instruction register IR of CPU 10.

Apparatus 200 for controlling memory access can comprise an instruction parsing unit 220 for parsing an obtained access instruction. The access instruction may include an addressing field as described by referring to FIGS. 3-7 hereinabove. The instruction parsing unit 220 can parse various fields to determine the values of respective fields.

Then, according to the parsing result of the instruction parsing unit 220, an access module determining unit 230 in access control apparatus 200 can determine one or more memory modules to be accessed based on a parallel control field and a module address field. Herein, the parallel control field may have any structure described in FIGS. 3-7 or combinations thereof, and as described above, when necessary, the parallel control field may comprise a circular control field. The processing steps of determining one or more memory modules to be accessed based on the parallel control field and module address field have been described in detail above referring to FIGS. 3-7, therefore detailed description thereof is omitted here.

Referring continue to FIG. 8, apparatus 200 for controlling memory access further may comprise an access performing unit 240 carrying out a parallel access to one or more addresses which are within one or more memory modules to be accessed and assigned by an in-module address field. In one example, apparatus 200 for controlling memory access further may optionally comprise an instruction buffer unit 250 for storing the parsed instruction in a buffer sequence to be executed by access performing unit 240.

Herein, it shall be understood by a person skilled in the art that, the specific functions and operations of various units and modules in the apparatus 200 for controlling memory access have been described in detail by referring to FIG. 1 to FIG. 7, and thus, detailed description thereof is omitted.

As described above, the apparatus 200 for controlling memory access according to some embodiments of the present application can be implemented in various terminal devices such as computers comprising SRAM and/or DRAM array. In one example, apparatus 200 for controlling memory access according to some embodiments of the present application can be integrated into a terminal device as a software module and/or hardware module. For example, this apparatus 200 for controlling memory access can be a software module in the operation system of the terminal device, or can be an application developed directed to the terminal device. In some instance, this apparatus 200 for controlling memory access also can be one of the numerous hardware modules of the terminal device.

Exemplary Electronic Device

Figure 9:
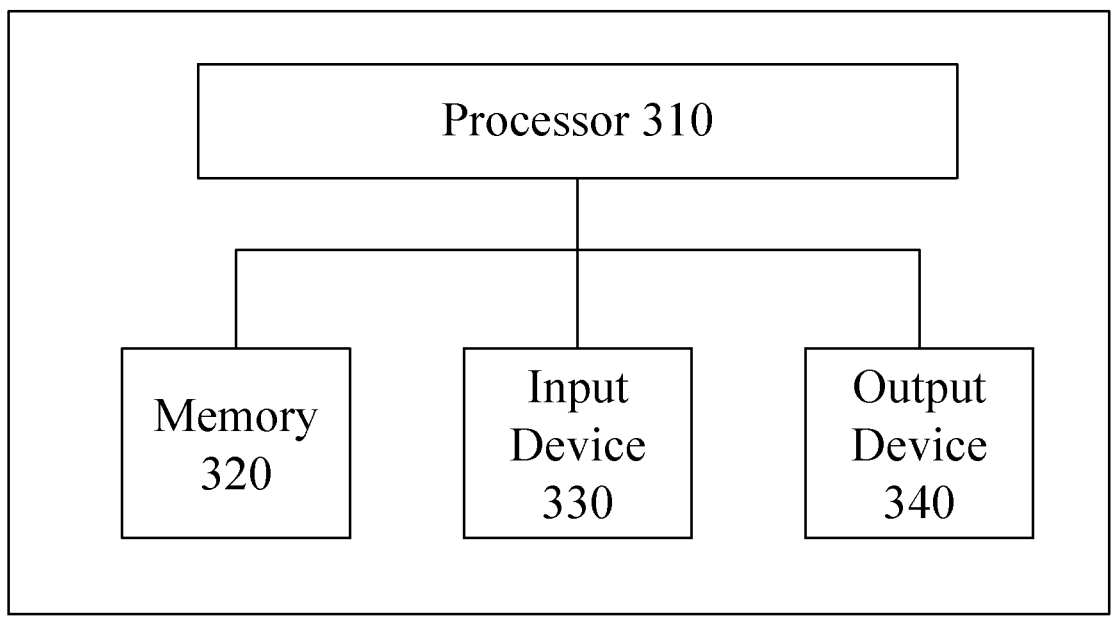
FIG. 9 shows a functional block diagram of an electronic device according to an embodiment of the present application.

FIG. 9 shows a structure block diagram of an electronic device according to an embodiment of the present application.

As shown in FIG. 9, an electronic device 300 comprises a processor 310 and a memory 320.

Processor 310 can be a central processing unit (CPU) or a processing unit of other type with data processing capability and/or instruction execution capability, for example graphics processing unit (GPU), or also can be a processing unit of other type, and can control other components in the electronic device 300 to carry out the desired functions.

Memory 320 can comprise one or more computer program products, which can comprise computer readable storage media of various forms, for example volatile memory and/or non-volatile memory. The volatile memory for example can comprise random access memory (RAM) and/or high speed cache memory (cache) etc. the non-volatile memory for example can comprise read only memory (ROM), hard disk, flash memory etc. One or more computer program instructions can be stored on the computer readable storage media, which could be executed by processor 310 to perform the method for controlling memory access of respective embodiment of the present application described above and/or other desired functions. In the computer readable storage media there could be further stored various contents such as access data etc.

In one example, electronic device 300 may further comprise an input device 330 and an output device 340, and these components are interconnected by bus system and/or connection mechanism of other forms (not shown).

For example, this input device 330 can comprise for example keyboard, mouse etc.

This output device 340 can output various information including the results of program code execution, to the outside. This output device 340 can comprise for example a display, a speaker, a printer, and communications network and a remote output device connected thereto etc.

For simplicity, FIG. 9 only illustrates in this electronic device 300 some of the components associated with the present application, so components such as bus, input/output interface etc. are omitted. Besides, according to specific application, electronic device 300 can further comprise any of other proper components.

Exemplary Computer Program Products and Computer Readable Storage Media

In addition to the methods and devices described above, embodiments of the present application further can be computer program products, which comprise computer program instructions, upon the execution of which by a processor, the processor can carry out the steps in the method for controlling memory access according to various embodiments of the present application described in the parts of the "Exemplary Methods" of this description.

Regarding the computer program product, the program codes for carrying out operation of embodiment of the present application can be compiled by any combination of one or more programming languages including object-oriented programming language such as Java, C++ etc., further conventional procedural programming language such as "C" language or similar programming language. Program codes can be executed on a user computing device completely, executed on a user device partially, executed as an independent software package, executed on a user computing device partially while executed on a remote computing device partially, or executed on a remote computing device or server completely.

Moreover, embodiments of the present application can further be computer readable storage media, on which computer program instructions are stored, upon the execution of which by a processor, the processor can carry out steps in the method for controlling memory access according to various embodiment of the present application described in the parts of "Exemplary methods" of this description.

The computer readable storage media can be any combination of one or more readable media. The readable media can be readable signal media or readable storage media. The readable storage media for example can comprise electronic, magnetic, optical, electromagnetic, infrared, or semiconductor system, apparatus, device, or a combination thereof. More specific examples (a non-exhaustive list) of the readable storage media would include the following: an electrical connection having one or more wires, a portable disk, a hard disk, a random access memory (RAM), a read-only memory (ROM), an erasable programmable read only memory (EPROM or flash memory), an optic fiber, a portable compact disk read-only memory (CD-ROM), an optical storage device, a magnetic storage device, or any proper combination thereof.

The basic principles of the present application are described in conjunction with specific embodiment hereinabove. However, it shall be noted that the merits, advantages, effects etc. mentioned in the present application are merely examples rather than limitations, so it shall not be considered that these merits, advantages, effects etc. are necessary for respective embodiment of the present application. In addition, specific details disclosed hereinabove are merely serving as examples for illustration and facilitating the understanding, rather than limitations, and it is not necessary for the present application to be implemented by using the specific details hereinabove.

The block diagrams of devices, apparatuses, equipment, or systems involved in the present application are merely exemplary embodiments and it is not intended to require or imply that a connection, a configuration, or an arrangement has to be connected, configured, or arranged in the way described in the block diagrams. As will be recognized by a person skilled in the art, these devices, apparatuses, equipment, or systems can be connected, configured, or arranged in any way. Terms such as "comprising", "including", "having" etc. are to be construed in an inclusive sense, meaning "comprising but not limited to", and can be used interchangeably. The terms "or" and "and" used herein means term "and/or", and can be used interchangeably, unless it is clearly stated otherwise in the context. The term "such as" used herein refers to phrase "such as but not limited to", and can be used interchangeably.

It also shall be noted that, in the devices, apparatuses and methods of the present application, respective components or steps can be disassembled and/or recombined. The disassembled and/or recombined ones shall be deemed as the equivalent solutions to the present application.

The descriptions of various aspects are provided above such that a person skilled in the art can make or use the present application. Numerous modifications will be apparent to a person skilled in the art, and the general principles defined herein are applicable to other aspect without departing from the scope of the present application. Thus, the present application is not intended to be limited to the aspects shown herein, but is the broadest scope consistent with the principles and novel technical features disclosed herein.

Descriptions have been given for the purpose of illustration and explanation above. Moreover, the embodiments of the present application are not intended to be limited to the forms disclosed herein. Although a plurality of exemplary aspects and embodiments have been discussed hereinabove, a person skilled in the art will conceives of some variations, modifications, changes, additions and sub-combinations thereof.

What is claimed is:

1. A method for controlling access to a memory including a plurality of memory modules configured in parallel, comprising:
    receiving an access instruction including an addressing field which comprises a parallel control field for controlling a parallel access, a module address field for indicating a memory module, and an in-module address field for indicating an address within a memory module;
    parsing the access instruction to determine the parallel control field, the module address field and the in-module address field;
    determining one or more memory modules to be accessed based on the parallel control field and the module address field; and
    accessing one or more addresses which are within the one or more memory modules to be accessed and assigned by the in-module address field,
    wherein the parallel control field comprises a module quantity field indicating a number of memory modules to be parallelly accessed and a stride field indicating an interval among the plurality of memory modules to be accessed, and
    wherein determining the one or more memory modules to be accessed based on the parallel control field and the module address field comprises:
    determining the one or more memory modules to be accessed beginning at a memory module assigned by the module address field and having the interval indicated by the stride field and having the number assigned by the module quantity field as the one or more memory modules to be accessed.

2. The method of claim 1, wherein, the parallel control field comprises a module control code indicating that a corresponding bit within the module address field can have arbitrary values, and
    wherein, determining one or more memory modules to be accessed based on the parallel control field and the module address field comprises allocating arbitrary values to the corresponding bit within the module address field based on the module control code, thereby resulting one or more memory module addresses associated with the one or more memory modules to be accessed.

3. The method of claim 2, wherein, a number of bits included in the parallel control field is equal to or less than a number of bits included in the module address field.

4. The method of claim 2, wherein, the addressing field further comprises a circular control field including a circular control code indicating that a corresponding bit within the module address field can have arbitrary values, a circular range including one or more memory modules can be determined based on the circular control code and the module address field,
    and
    wherein, the access to the memory begins at one or more memory modules to be accessed determined by the parallel control field and the module address field, and carries out a circular addressing operation in the circular range.

5. The method of claim 4, wherein, a number of bits of the circular control code is equal to or greater than that of the module control code.

6. The method of claim 1, wherein, the access instruction further includes a circular control field including a starting field indicating a starting memory module and an end field indicating an end memory module, the access to the memory begins at one or more memory modules to be accessed determined by the parallel control field and the module address field, and carries out a circular addressing operation between the starting memory module and the end memory module.

7. An apparatus for controlling access to a memory including a plurality of memory modules configured in parallel, comprising:
    an instruction parsing unit, for parsing an access instruction including an addressing field which comprises a parallel control field for controlling parallel access, a module address field for indicating a memory module, and an in-module address field for indicating an address within a memory module;
    a module determining unit, for determining one or more memory modules to be accessed based on the parallel control field and the module address field; and
    an access performing unit, for carrying out the access to the one or more addresses which are within the one or more memory modules to be accessed and assigned by the in-module address field,
    wherein the parallel control field comprises a module quantity field indicating a number of memory modules to be parallelly accessed and a stride field indicating an interval among the plurality of memory modules to be accessed, and
    wherein the module determining unit is further configured to determine the one or more memory modules to be accessed beginning at a memory module assigned by the module address field and having the interval indicated by the stride field and having the number assigned by the module quantity field as the one or more memory modules to be accessed.

8. The apparatus of claim 7, wherein, the apparatus further comprises an instruction capturing unit for obtaining the access instruction from an instruction storage unit.

9. The apparatus of claim 7, wherein, the apparatus further comprises an instruction buffer unit for storing the parsed instruction in a buffer sequence to be executed by the access performing unit.

10. The apparatus of claim 7, wherein, the parallel control field further comprises a module control code indicating that a corresponding bit within the module address field can have arbitrary values, and
   wherein, the module determining unit is further configured to allocate arbitrary values to the corresponding bit within the module address field based on the module control code, thereby resulting one or more memory module addresses associated with the one or more memory modules to be accessed.

11. The apparatus of claim 10, wherein, a number of bits included in the parallel control field is equal to or less than a number of bits included in the module address field.

12. The apparatus of claim 10, wherein, the addressing field further comprises a circular control field including a circular control code indicating that a corresponding bit within the module address field can have arbitrary values, a circular range including one or more memory modules can be determined based on the circular control code and the module address field,
   wherein, one or more bits which are within the module address field and corresponding to the module control code are included in a range of bits corresponding to the circular control code, and
   wherein, the access performing unit is further configured to carry out the access to the memory beginning at one or more memory modules to be accessed determined by the parallel control field and the module address field, and carrying out a circular addressing operation in the circular range.

13. The apparatus of claim 12, wherein, a number of bits of the circular control code is equal to or greater than that of the module control code.

14. The apparatus of claim 7, wherein, the access instruction further includes a circular control field including a starting field indicating a starting memory module and an end field indicating an end memory module, and
   wherein, the access performing unit is further configured to carry out the access to the memory beginning at one or more memory modules to be accessed determined by the parallel control field and the module address field, and carrying out a circular addressing operation between the starting memory module and the end memory module.

15. An electronic device, comprising:
   a processor; and
   a first memory including program instructions stored thereon which when executed by the processor cause the processor to perform a method for controlling access to a second memory including a plurality of memory modules configured in parallel, the method comprising:
   receiving an access instruction including an addressing field which comprises a parallel control field for controlling a parallel access, a module address field for indicating a memory module, and an in-module address field for indicating an address within a memory module;
   parsing the access instruction to determine the parallel control field, the module address field and the in-module address field;
   determining one or more memory modules to be accessed based on the parallel control field and the module address field; and
   accessing one or more addresses which are within the one or more memory modules to be accessed and assigned by the in-module address field,
   wherein the parallel control field comprises a module quantity field indicating a number of memory modules to be parallelly accessed and a stride field indicating an interval among the plurality of memory modules to be accessed, and
   wherein determining the one or more memory modules to be accessed based on the parallel control field and the module address field comprises:
   determining the one or more memory modules to be accessed beginning at a memory module assigned by the module address field and having the interval indicated by the stride field and having the number assigned by the module quantity field as the one or more memory modules to be accessed.

16. One or more non-transitory computer-readable storage media, including program instructions stored thereon that when executed by a processor cause the processor to perform a method for controlling access to a memory including a plurality of memory modules configured in parallel, the method comprising:
   receiving an access instruction including an addressing field which comprises a parallel control field for controlling a parallel access, a module address field for indicating a memory module, and an in-module address field for indicating an address within a memory module;
   parsing the access instruction to determine the parallel control field, the module address field and the in-module address field;
   determining one or more memory modules to be accessed based on the parallel control field and the module address field; and
   accessing one or more addresses which are within the one or more memory modules to be accessed and assigned by the in-module address field,
   wherein the parallel control field comprises a module quantity field indicating a number of memory modules to be parallelly accessed and a stride field indicating an interval among the plurality of memory modules to be accessed, and
   wherein determining the one or more memory modules to be accessed based on the parallel control field and the module address field comprises:
   determining the one or more memory modules to be accessed beginning at a memory module assigned by the module address field and having the interval indicated by the stride field and having the number assigned by the module quantity field as the one or more memory modules to be accessed.

* * * * *

UNITED STATES PATENT AND TRADEMARK OFFICE
CERTIFICATE OF CORRECTION

PATENT NO. : 11,144,215 B2
APPLICATION NO. : 16/697954
DATED : October 12, 2021
INVENTOR(S) : Honghe Tan et al.

It is certified that error appears in the above-identified patent and that said Letters Patent is hereby corrected as shown below:

In the Specification

Column 5, Line 45, delete "21" and insert -- $2^j$ --.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*